United States Patent
Mohaban et al.

(10) Patent No.: US 7,423,971 B1
(45) Date of Patent: Sep. 9, 2008

(54) METHOD AND APPARATUS PROVIDING AUTOMATIC RESV MESSAGE GENERATION FOR NON-RESV-CAPABLE NETWORK DEVICES

(75) Inventors: Shai Mohaban, Sunnyvale, CA (US); Itzhak Parnafes, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 747 days.

(21) Appl. No.: 09/586,531

(22) Filed: May 31, 2000

(51) Int. Cl.
*G01R 31/08* (2006.01)
(52) U.S. Cl. .................. 370/236; 370/230; 370/235
(58) Field of Classification Search ............. 370/230, 370/235, 236, 401; 709/238
See application file for complete search history.

(56) References Cited

U.S. PATENT DOCUMENTS

| 6,101,549 | A  | * | 8/2000  | Baugher et al. | ......... | 709/238 |
| 6,765,927 | B1 | * | 7/2004  | Martin et al.  | ........ | 370/469 |
| 2001/0027490 | A1 | * | 10/2001 | Fodor et al. | ............ | 709/238 |
| 2004/0022191 | A1 | * | 2/2004  | Bernet et al. | ............ | 370/230 |

FOREIGN PATENT DOCUMENTS

WO       WO 01/31829      *   5/2001

OTHER PUBLICATIONS

Gai et al. "RSVP Receiver Proxy" draft-sgai-rsvp-proxy-00.txt Network Working Group. Oct. 1999. pp. 1-15.*
Lin et al. "Speech communication for working group based on LAN". IEEE. Oct. 18, 1999-Oct. 22, 1999. pp. 880-883.*
White, Paul. "RSVP and Integrated Services in the Internet: A Tutorial". IEEE. May 1997. pp. 100-106.*
Braden et al. "Resource Reservation Protocol (RSVP)—Version 1 Function Specification". RFC 2205. Sep. 1997. pp. 32-41.*
Durham et al. "RCF 2748—The COPS (Common Open Policy Server) Protocol". IETF. Jan. 2000. pp. 1-38.*
Braden et al. "Resource ReSerVation Protocol (RSVP)—Version 1 Functional Specification", Network Working Group RFC 2205. pp. 1-112. September, 1997.*

* cited by examiner

*Primary Examiner*—Firmin Backer
*Assistant Examiner*—Jason Mattis
(74) *Attorney, Agent, or Firm*—Hickman Palermo Truong & Becker LLP

(57) ABSTRACT

A method and apparatus for providing network resource reservation capability for receiver nodes that either cannot or do not facilitate RSVP processes is provided. A RESV proxy is connected between an anticipated sender node and an anticipated receiver node in a computer network, e.g., a voice over IP network. The RESV proxy can detect an RSVP Path message and determine whether a RESV message is appropriate for the anticipated traffic flow. If it is so determined, the RESV proxy generates and communicates a RESV message through the network back to the anticipated sender node. The appropriateness of a RESV message can be based upon predetermined relationships or logic involving one or more of network parameters, transport parameters, and characteristics of the anticipated traffic flow, and other traffic flow attributes determined from analyzing the RSVP Path message. The RESV proxy can also interface with a policy server on the network to facilitate generation of the RESV message according to one or more of the anticipated traffic flow attributes. Alternatively, the RESV proxy can include the policy server functionality itself.

28 Claims, 7 Drawing Sheets

METHOD AND APPARATUS PROVIDING AUTOMATIC RESV MESSAGE GENERATION FOR NON-RESV-CAPABLE NETWORK DEVICES

FIELD OF THE INVENTION

The present invention generally relates to computer networking. The invention relates more specifically to a method and apparatus for automatically facilitating reservations on network devices for a traffic flow directed from an originating node to a receiving node that is enabled to participate in such reservation.

BACKGROUND OF THE INVENTION

A computer network typically comprises a plurality of interconnected entities that transmit date frames ("sources," "senders") or entities that receive data frames ("sinks," "receivers," "destinations"). A common type of computer network is a local area network ("LAN") that generally comprises a privately owned network within a single building or campus. LANs employ a data communication protocol (LAN standard) such as Ethernet, FDDI, or Token Ring, that defines the functions performed by the data link and physical layers of a communications architecture (i.e., a protocol stack), such as the Open Systems Interconnection (OSI) Reference Model. In many instances, multiple LANs may be interconnected by point-to-point links, microwave transceivers, satellite hookups, etc., to form a wide area network ("WAN"), metropolitan area network ("MAN") or Intranet. These internetworks may be coupled through one or more gateways to the global, packet-switched internetwork known as the Internet.

Each network entity preferably includes network communication software, which may operate in accordance with Transport Control Protocol/Internet Protocol (TCP/IP) or some other suitable protocol. A protocol generally consists of a set of rules defining how entities interact with each other. In particular, TCP/IP defines a series of communication layers, including a transport layer and a network layer. At the transport layer, TCP/IP includes both the User Data Protocol (UDP), which is a connectionless transport protocol, and TCP, which is a reliable, connection-oriented transport protocol. When a process at one network entity (source) wishes to communicate with another entity, it formulates one or more messages and passes them to the upper layer of the TCP/IP communication stack. These messages are passed down through each layer of the stack where they are encapsulated into packets and frames. Each layer also adds information in the form of a header to the messages. The frames are then transmitted over the network links as bits. At the destination entity, the bits are re-assembled and passed up the layers of the destination entity's communication stack. At each layer, the corresponding message headers are also stripped off, thereby recovering the original message which is handed to the receiving process.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information, such as data frames or packets, among entities of a computer network. Typically, the switch is a computer having a plurality of ports (i.e., logical network interfaces ("LI" or "interfaces")) that couple the switch to several LANs and to other switches. The switching function includes receiving data frames at a source port and transferring them to at least one destination port for receipt by another entity. Switches may operate at various levels of the communication stack. For example, a switch may operate at Layer 2 which, in the OSI Reference Model, is called the data link layer, and includes the Logical Link Control (LLC) and Media Access Control (MAC) sub-layers.

Other intermediate devices, commonly known as routers, may operate at higher communication layers, such as Layer 3, which, in TCP/IP networks, corresponds to the Internet Protocol (IP) layer. EP data packets include a corresponding header which contains an IP source address and an IP destination address. Routers or Layer 3 switches may re-assemble or convert received data frames from one LAN standard (e.g., Ethernet) to another (e.g., Token Ring). Thus, Layer 3 devices are often used to interconnect dissimilar sub-networks. Some Layer 3 intermediate network devices may also examine the transport layer headers of received messages to identify the corresponding TCP or UDP port numbers being utilized by the corresponding network entities. Many applications are assigned specific, fixed TCP and/or UDP port numbers in accordance with Request For Comments (RFC) 1700. For example, TCP/UDP port number 80 corresponds to the Hypertext Transport Protocol (HTTP), while port number 21 corresponds to File Transfer Protocol (FTP) service.

Quality of Service (Qos)

Networks that use the packet data communication technology as described above are now undergoing adaptation to carry voice traffic. In such "voice over IP" ("VoIP") networks, processes executing at network entities (e.g., Internet hosts) may generate hundreds or thousands of traffic flows that are transmitted across a network. Generally, a traffic flow is a set of messages (frames and/or packets) that typically correspond to a particular task, transaction, or operation (e.g., a print transaction), may be associated with an application, and may be characterized by values of various network and transport parameters such as source and destination IP addresses, source and destination TCP/UDP port numbers, and transport protocol.

Computer networks typically include numerous services and resources for use in moving traffic flows throughout the network. For example, different network links, such as Fast Ethernet, Asynchronous Transfer Mode (ATM) channels, network tunnels, satellite links, etc., offer unique speed and bandwidth capabilities. Particular intermediate devices also include specific resources or services, such as number of priority queues, filter settings, availability of different queue selection strategies, congestion control algorithms, etc. Each port/logical network interface (LI) of a network device can provide a different service or resource. For ease of explanation, the term "network device," unless expressly stated otherwise, herein refers to the device in its entirety or one or more ports/LIs.

To maximize the performance of a traffic flow across a network, a desired quality of service (QoS) can be requested. For a given traffic flow, a desired QoS can be designated for each of various aspects of the traffic flow treatment across the network (i.e., how various services and resources of the network interact with the traffic flow as it travels across the network). To deliver voice over IP traffic with acceptable quality, it is important to ensure that all network elements in a network path from sender to receiver are configured with QoS adequate to support VoIP.

Reservation of Network Resources

To obtain desired qualities of service (QoS), known mechanisms can be used to reserve resources across a network along a path between a source and intended destination of an intended future traffic flow. For example, the Resource Reservation Protocol (RSVP) provides a mechanism by which such resource reservations can be made. RSVP is defined in Internet Request For Comment (RFC) 2205. The RSVP protocol is a mechanism to establish a network resource reservation along a path from a sender to a receiver (or multiple receivers, in the case of multicast). Generally, it requires both the sender and receiver to be actively engaged in establishing the reservation.

When a source is capable of utilizing RSVP (i.e., it is RSVP-enabled), the source can generate and send an RSVP Path message along an intended path to the destination (i.e., intended, i.e., anticipated receiver). The RSVP Path message can specify the various characteristics of the traffic flow that is to be sent. Since IP is a connectionless protocol, RSVP can be used to set up paths for a traffic flow and guarantee bandwidth on the paths.

If the destination device is RSVP-enabled, upon receipt of the RSVP Path message the destination device can ignore the RSVP Path message, raise an error condition, or apply for reservation of one or more resources along the intended path. This can be done by generating and sending a RESV message through the intended path (including each device along that path) to the source. The RESV message can be recognized by RSVP-enabled devices along the intended path, which can either ignore the RESV message or reserve resources for the anticipated traffic flow.

Additional information regarding RSVP can be found in, e.g., U. Black, "Voice Over IP" (Upper Saddle River, N.J.: Prentice-Hall PTR, 2000), at 210; "Cisco Internetworking Technologies Handbook" (Macmillan Technical Publishing, 1998). The RSVP mechanism can be used with multicast or unicast traffic flows, and the discussions herein are equally applicable to both with suitable modification.

Unfortunately, some destinations of traffic flows are not designed or are otherwise unable to participate in a reservation process by returning a RESV message as discussed above. For example, the destination may be non-RSVP-enabled, not trusted, or merely designed or utilized so as not to bear the burden of handling the issue. For ease of description, such destinations are hereinafter collectively referred to as non-RESV-capable.

Further, supporting RSVP signaling can require a network device to have a large and complex protocol stack, with heavy demands on the source with respect to the memory footprint, O/S capabilities, and CPU load. Omitting these elements from network devices, while still providing RSVP capability in some way, would reduce the cost of such devices and fulfill a market need.

Providing large volumes of such less expensive devices, especially consumer-oriented end devices, can be commercially attractive to device manufacturers. An example of such devices is the IP phone; IP phones are not expected to be RSVP enabled. However, deployment of end-to-end RSVP signaling may be crucial in ensuring that voice-over-IP connections of reasonable quality can be consistently established.

Still another problem of present approaches is that there are large numbers of deployed and installed devices that do not currently support RSVP and RESV. Re-configuring or updating these devices to support such protocols would be expensive, time-consuming, and could require adding more memory or processing power to the existing devices, which is undesirable.

When applications or other destinations on such lower capability devices are the intended destination of a traffic flow, the RSVP mechanism of providing QoS for the traffic flow typically cannot be utilized. Unfortunately, to provide services, such as carrying voice over IP, with desirable quality, RSVP capability can be critical. Yet upgrading such devices to support RSVP can prohibitively increase the cost of the devices.

Based on the foregoing, there is a clear need in this field for a mechanism for generating and communicating a RESV message associated with a traffic flow that is intended to be sent to a non-RESV-capable destination.

In particular, there is a need to provide such a system and method with minimal cost and complexity and maximum efficiency.

There is a need to provide a way for non-RSVP-enabled devices to recognize RSVP messages and respond with network resources reservations, at minimum cost and without modifying such existing devices.

SUMMARY OF THE INVENTION

The foregoing objects and advantages, and other objects and advantages that will become apparent from the following description, are achieved by the present invention, which comprises, in one embodiment, a method of establishing a network resources reservation for an anticipated traffic flow along a path in a network between an anticipated source and an anticipated receiver of the traffic flow, wherein the anticipated receiver otherwise cannot facilitate establishing the network resources reservation. The method may comprise detecting an RSVP Path message associated with the anticipated receiver of the anticipated traffic flow at a proxy node located within the path, determining whether to establish the network resources reservation, generating an RESV message to reserve network resources for the anticipated traffic flow, and communicating the RESV message to the anticipated source of the anticipated traffic flow.

One feature involves determining one or more device and traffic parameter values associated with the anticipated traffic flow, and a related feature is that the step of generating the RESV message comprises the step of generating the RESV message based on at least one of the device and traffic parameter values.

In another feature, the method further comprises receiving predefined policy information and generating the RESV message based on the predefined policy information. In yet another feature, the step of determining whether to initiate an RSVP reservation process includes the steps of determining one or more network parameter values associated with the anticipated traffic flow, determining one or more transport parameter values associated with the anticipated traffic flow, determining next and previous hop parameter values associated with the anticipated traffic flow, and correlating at least one of the ascertained network parameter, transport parameter, next hop parameter, and previous hop parameter values with information defining a relationship between them and whether a RESV message is desired. In yet another feature, the step of detecting an RSVP Path message comprises the step of detecting an RSVP Path message associated with the anticipated receiver of the anticipated traffic flow at a proxy node that is logically positioned adjacent to the path.

In another aspect, a proxy device is located on the path from the sender to the receiver, in a network in which the sender uses RSVP signaling. The proxy device receives the RSVP Path message, inspects the message, and determines whether it should serve as an auto-reserve agent or RESV proxy on behalf of the receiver. The decision can be based on parameters found in the Path message, such as session parameters (e.g., source and destination IP addresses and port numbers, and protocol), next hop and previous hop values, and policy information that is carried in the message. If the proxy device decides to serve as an auto-reserve agent, then the proxy device returns an RESV message to the sender on behalf of the receiver. The proxy device may forward the Path message to the receiver, or not forward it and thereby serve as a terminator of it. In the cause of multicast signaling, the proxy device can send RESV messages for only some of all the intended receivers, and may forward the Path message to a subset of receivers.

Other features and aspects will become apparent from the following detailed description.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

In one embodiment, a method and apparatus is described for generating and communicating a RESV message in response to an RSVP Path message associated with a traffic flow intended to be sent to a non-RESV-capable destination. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Structural Overview of RESV Proxy System

Figure 1A:
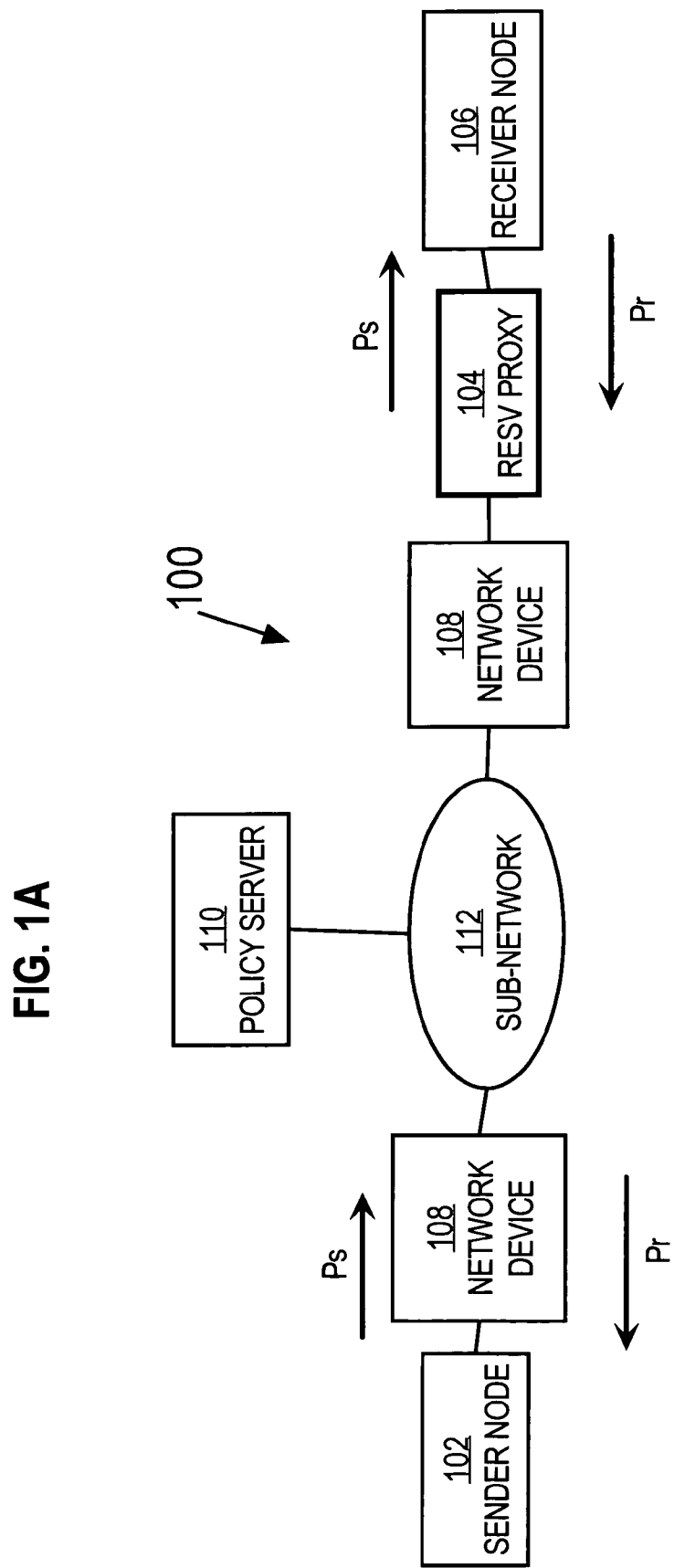
FIG. 1A is a block diagram of a first network including a RESV proxy, in accordance with an embodiment of the present invention.

FIG. 1A is a block diagram of an exemplary computer network that is configured to facilitate the reservation of network resources, according to RSVP, for a traffic flow that is intended to be received by a destination that is not capable of facilitating such a reservation itself.

Network 100 includes a sender node (i.e., source of an RSVP Path message) 102, a RESV proxy 104, one or more receiver nodes (i.e., destinations) 106, one or more network devices 108, a policy server 110, and the remainder of the network, or sub-network 112 which may include one or more additional network devices. Each of these components is connected to each other, directly or indirectly, physically or otherwise.

In particular, RESV proxy 104 is connected in the network path in a position where it will receive information passed from the sender node 102 and intended to be received by the receiver node 106 (either physically in the path as shown here, or able to sniff traffic, as in FIG. 1B described below). As an example, in FIG. 1A the RESV proxy 104 is shown with no network devices between it and the receiver node 106; however, one or more network devices can be connected between them. Similarly, none or any number of network devices can be connected between the RESV proxy 104 and the sender node 102.

The sender node 102 is any suitable network device that includes a source that can generate an RSVP Path message associated with an anticipated traffic flow, to initiate an associated resource reservation process (RSVP-enabled). Such a source can be, for example, a client or server computer that executes the Windows 2000 operating system, a router, VoIP Gateway, etc. The source can be configured to also generate the anticipated traffic flow, and/or can be an RSVP proxy.

One or more network devices 108 and the remainder of the network, or sub-network 112 can be located along a send traffic flow path (indicated by arrows Ps) between the sender node 102 and the one or more receiver nodes 106. One or more of the network devices 108 and the devices of sub-network 112 can be configured to reserve resources in the network or in themselves in accordance with RSVP.

The one or more receiver nodes 106 can be any suitable network devices or applications that can be the intended destination device of a traffic flow originated by the sender node 102. Typically, a receiver node is a server that contains network resources needed by a client in the position of the sending node. If the traffic flow is unicast, only one receiver node 106 will be at the end of the traffic flow path P, while more than one receiver node 106 may be included if the traffic flow is multicast. At least one of the receiver nodes 106 can be incapable of responding to the receipt of an RSVP Path message by generating and communicating a RESV message (i.e., non-RESV-capable).

RESV proxy 104 is located in the network so that it can detect new RSVP Path messages sent by the sender node 102. In FIG. 1A, this location is on the traffic flow path Ps (i.e., as an intermediate gateway in the message's route) and the message passes to the RESV proxy. For example, the RESV proxy 104 can be located at the first switch or router to which the receiver node 106 is connected.

Such a device can also be configured to detect various parameter values in the RSVP Path message that are associated with the network, and transport parameter values associated with the anticipated traffic flow. Such parameter values include source and destination IP addresses and port numbers, and the transport protocol. The RSVP protocol identifies SESSION and SENDER_TEMPLATE objects that carry these values, as stated in RFC 2205.

RESV proxy 104 is also configured to determine whether it is desirable to generate and communicate a RESV message, associated with the detected RSVP Path message, back to the sender node 102 along the RESV message flow path (indicated by the arrows Pr). Such configuration can include predetermined relationships or logic based on characteristics of the RSVP Path message, such as information regarding the intended receiver node of the traffic flow associated with the RSVP Path message. Information regarding the intended receiver node is specified in the SCOPE object of an RSVP message. Such characteristics or parameters can then be used to determine whether to generate and communicate RESV signaling for the flow.

For example, the RESV proxy can be configured, for example by a network administrator, to generate and communicate a RESV message when characteristics of or objects in a detected RSVP Path messages are associated with anticipated traffic flows directed to a particular receiver node, or a type of receiver node.

In some embodiments, the RESV proxy might not be configured to determine whether a RESV message is needed. For example, such capability may not be needed if the RESV proxy encounters RSVP Path flows that are intended to be received by only receiver nodes 106 that are non-RESV-capable. In such cases, it is desirable for the RESV proxy to always generate a RESV message. Using such a RESV proxy would benefit from appropriate placement within the network, and/or appropriate configuration, such that the RESV proxy encounters RSVP Path messages intended to be received by only receiver nodes that are non-RESV-capable.

As is shown in FIG. 1A, a policy server 110 is located on the network, but is not necessarily located along the send traffic flow path Ps. The policy server 110 can be any suitable device that can include one or more quality of service policies associated with one or more attributes of traffic flows and/or other network attributes. Thus, policy server 110 can include predetermined relationships or logic that can define an appropriate policy or policies in accordance with the one or more attributes of a given traffic flow. An example of policy server 110 is Cisco Quality of Service Policy Manager.

Policy server 110 can be configured to return an appropriate policy for generating and communicating the RESV message, including defining characteristics of the RESV message, based on the characteristics of the RSVP Path message associated with the traffic flow and/or the characteristics of the intended receiver node(s). For example, in the case of a flow representing a voice call, a policy can be predefined indicating that all routers must be configured to use immediate packet forwarding or guaranteed bandwidth for that flow.

Policy server 110 can be dedicated to the RESV proxy operation, or can also provide policies for other aspects of the network 100 operation. While the policy server 110 is depicted in FIG. 1A as a device separate from the RESV proxy 104, the policy server 110 or its equivalent alternatively or additionally can reside on the RESV proxy device 104.

Figure 1B:
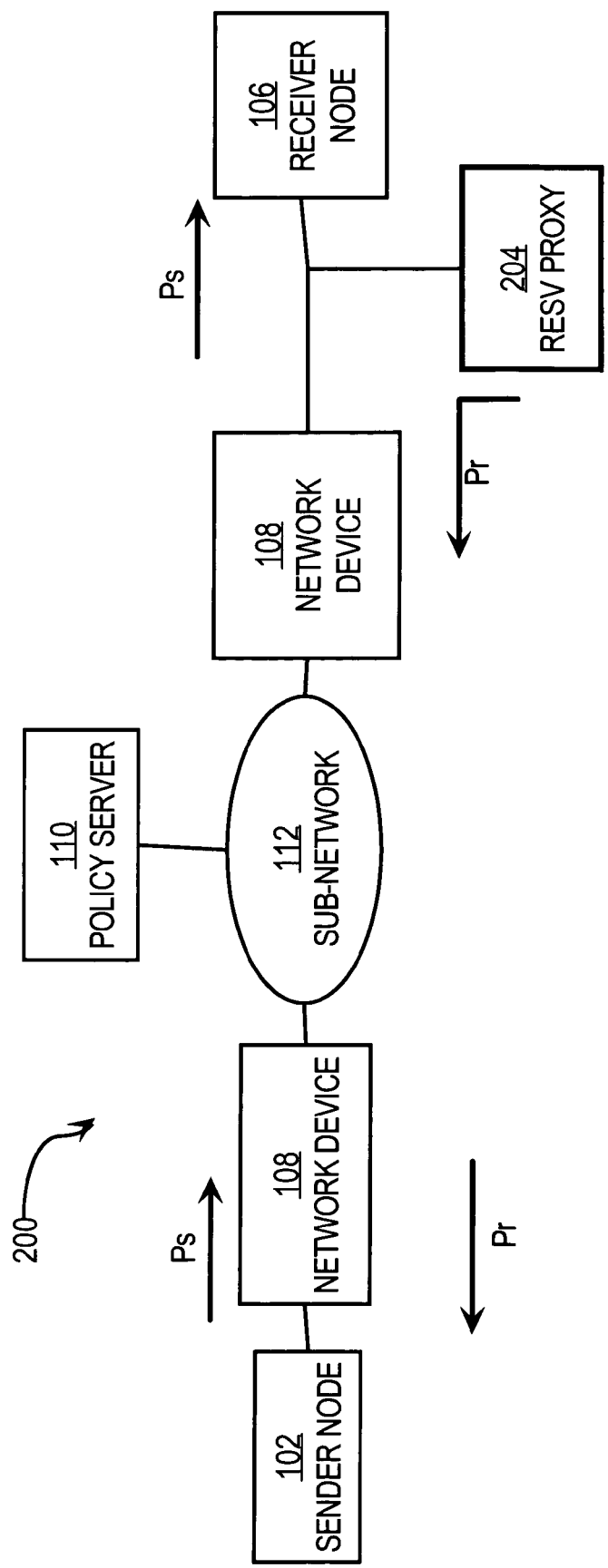
FIG. 1B is a block diagram of a second network including a RESV proxy, in accordance with an embodiment of the present invention.

FIG. 1B depicts a block diagram of a network 200. Like numbered elements of FIG. 1B as compared to FIG. 1A are substantially the same as those described above with reference to FIG. 1.

In FIG. 1B, however, RESV proxy 204 is connected to a shared medium along the path Ps, rather than being located directly along the send traffic flow path Ps. For example, the RESV proxy 204 can be located at an external host on the same shared media (e.g., Ethernet) as the sender node, or such a host connected to a spanning port of the switch to which the sender node is connected. Alternatively, the RESV proxy 204 can be located at an ingress point into a different network (e.g., into an ISP, or to a WAN connection).

In this configuration, RESV proxy 204 can operate as a packet sniffer to detect new RSVP Path messages that pass along the send traffic flow path Ps, as well as characteristics of the RSVP Path message associated with the anticipated traffic flow. The RESV proxy 204 is also configured to determine whether it is desirable to generate and communicate a RESV message, associated with the detected RSVP Path message and anticipated traffic flow, along the RESV traffic flow path Pr. Such configuration can include predetermined relationships and/or logic correlating characteristics of the RSVP Path message or characteristics of the traffic flow derived from the RSVP Path message characteristics.

For example, RESV proxy 204 may be configured on a host of a subnet of network 200. In this position, RESV proxy 204 listens to all RSVP messages entering the subnet and issues RESV messages on behalf of devices in the subnet, where the subnet hosts are not capable of recognizing or responding to RSVP messages.

An RESV proxy as described herein provides the benefits of RSVP resource reservation to end devices that are not themselves configured to facilitate such a process by responding to a RSVP Path message with a RESV message. In addition, using one such device in a location separate from the end device, these benefits are provided inexpensively and without increasing the complexity or cost of the end device. Furthermore, a single such device can be included in the paths of traffic flows from more than one sender device, thus magnifying the simplification and cost savings over what would be required to provide the same capabilities directly to the various end devices themselves.

Figure 2:
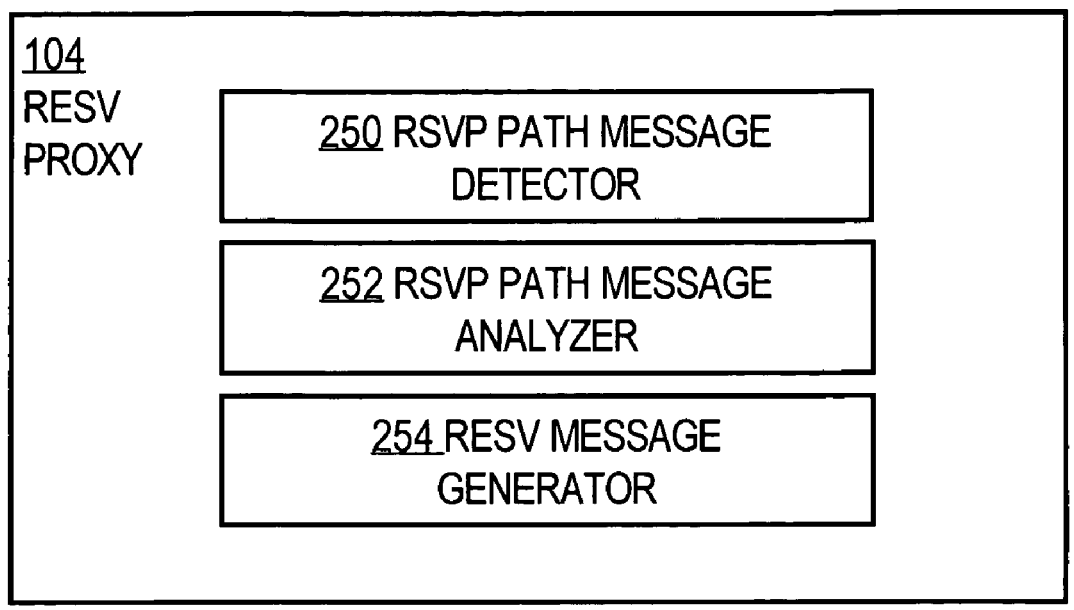
FIG. 2 is a schematic representation of constituents of a RESV proxy, in accordance with an embodiment of the present invention.

FIG. 2 is a schematic representation of elements that comprise RESV proxy 104 of FIG. 1A, according to one embodiment. As shown in FIG. 2, RESV proxy 104 includes an RSVP Path message detector 250, an RSVP Path message analyzer 252, and a RESV message generator 254.

RSVP Path message detector 250 is configured to detect signals that form an RSVP Path message. The RSVP Path message analyzer 252 is configured to identify and recognize the signals of an RSVP Path message detected by the RSVP Path message detector 250. These identified and recognized signals are then used by the RESV message generator 254, which is configured to generate signals that form a RESV message associated with, and based on, the RSVP Path message signals.

In one embodiment, RESV proxy 204 of FIG. 1B also comprises the elements shown in FIG. 2, appropriately modified to carry out detection of the RSVP Path messages and returning of the generated RESV message.

The elements of FIG. 2 may comprise one or more programmatic objects, methods, processes, subroutines, or other software elements that individually or collectively carry out the operational functions disclosed herein. In one embodiment, the elements of FIG. 2 are implemented in a router, gateway, or other network device. In another embodiment, the elements of FIG. 2 are executed by a server in the position of a receiver node. In still another embodiment, the elements of FIG. 2 are executed by a separate server or computer.

Functional Overview

Figure 3:
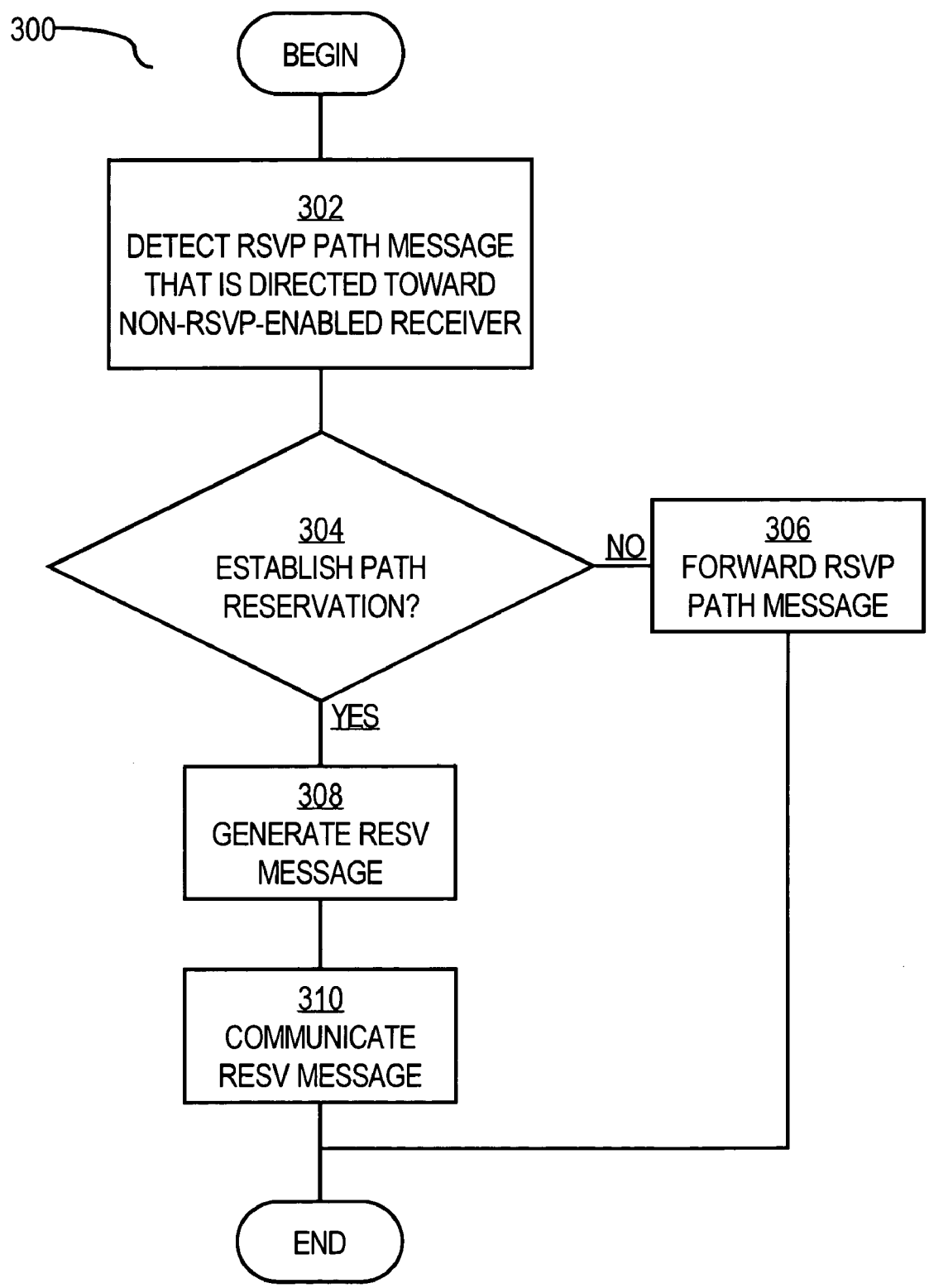
FIG. 3 is a flow diagram of a method for generating and communicating a RESV message, for a traffic flow targeted to a non-RESV-capable destination, in accordance with an embodiment of the present invention.

FIG. 3 is a block diagram of an exemplary method 300 for responding to an RSVP Path message associated with an anticipated traffic flow with at least one anticipated receiver, where the anticipated receiver is not itself capable of appropriately responding to the RSVP Path message.

An RSVP path message is detected in operation 302. In one embodiment, operation 302 involves detecting the message directly, or indirectly, e.g., with a packet sniffer. As described above, the RSVP Path message can include one or more traffic flow parameter values associated with the anticipated future traffic flow. The traffic flow parameters can include, for example, source and destination IP addresses and port numbers, protocol, next and previous hop parameters, policy elements, etc.

In operation 304, a decision is made whether a path reservation should be initiated, i.e., whether a RESV message should be generated and communicated. For example, if the RSVP Path message is associated with more than one intended receiver (e.g., the anticipated traffic flow is anticipated to be a multicast), operation 304 includes a decision for each such intended receiver.

The decision whether to establish a path reservation in operation 304 can be based upon one or more traffic flow parameter values included in the RSVP Path message. For example, the Path message may include a FLOWSPEC object or a FELTER_SPEC object that carry values indicating quality of service parameters that the receiving device can implement. In such a case, the decision whether to establish a path reservation may depend on whether the values of such objects specify a traffic flow that needs resources to be reserved.

Alternatively, or additionally, the decision of operation 304 can be based upon a previous configuration of the RESV proxy, or based on one or more predefined policies specifying logic, relationships, or rules for determining what type of resource reservation is appropriate. Such policies can reside, for example, in a policy server within the network or within the RESV proxy itself.

Different decisions of whether to establish path reservations for each of more than one intended receiver can be based on different traffic flow parameter information associated with each of such receivers, or based on differences between the receivers. For example, information about such differences is based on previous RESV proxy configuration and/or received policies. In some instances, although the anticipated receiver of the RSVP Path message is capable of generating and communicating a RESV message, it can nevertheless be decided in operation 304 that a RESV message should be generated.

If operation 304 determines that a path reservation should not be established (for example, if the intended receiver is RSVP-enabled and can, therefore, respond to the RSVP Path message), then the RSVP Path message is forwarded, as shown by operation 306. The RSVP Path message can be forwarded to the anticipated receiver (i.e., destination) of the traffic flow associated with the RSVP Path message detected in operation 302. If the RSVP Path message is associated with more than one intended receiver (e.g., the traffic flow will be a multicast), then the RSVP Path message can be forwarded in operation 306 to one or more of the multiple anticipated receivers for which it is determined that a path reservation should not be established by the RESV proxy.

In alternative embodiments, method 300 does not include operation 304 or operation 306. Instead, control is passed from operation 302 to operation 308, in which an RESV message is generated, as described below.

If operation 304 determines that path reservation should be generated, and in alternative embodiments where operation 304 is omitted, a RESV message is generated in operation 308. The content of the RESV message can be based, at least in part, on attributes of the detected RSVP Path message. For example, each Path message normally contains a SENDER_TEMPLATE object defining the format of the data packets and a SENDER_TSPEC object specifying the traffic characteristics of the flow. The resources needed for a reservation, and the content of an RESV message, can be based on the values of these objects.

Further, message attributes or object values of an RSVP Path message can be correlated with predefined relationships or logic, such as policies, that relate such object values or attributes to RESV message components. The predefined relationships can be defined prior to the detection of the RSVP Path message of method 300, for example, during configuration of the RESV proxy.

As a result, an RESV message is generated that includes information identifying the requested resource reservation in network devices along the intended path between the source and destination. If resources matching the parameters of the RSVP Path message are not available in the network path from sender to receiver, then the requested resource reservation can differ from that suggested according to the RSVP path message detected in operation 302.

In operation 310, the resulting RESV message is communicated. In one embodiment, operation 310 involves sending the RESV message along the intended path, as defined based on the RSVP Path message detected in operation 302. Operation 310 also includes installing a RESV state on each of the network devices along the intended path, and returning the RESV message to the source, on behalf of the anticipated receiver or receivers.

Figure 4:
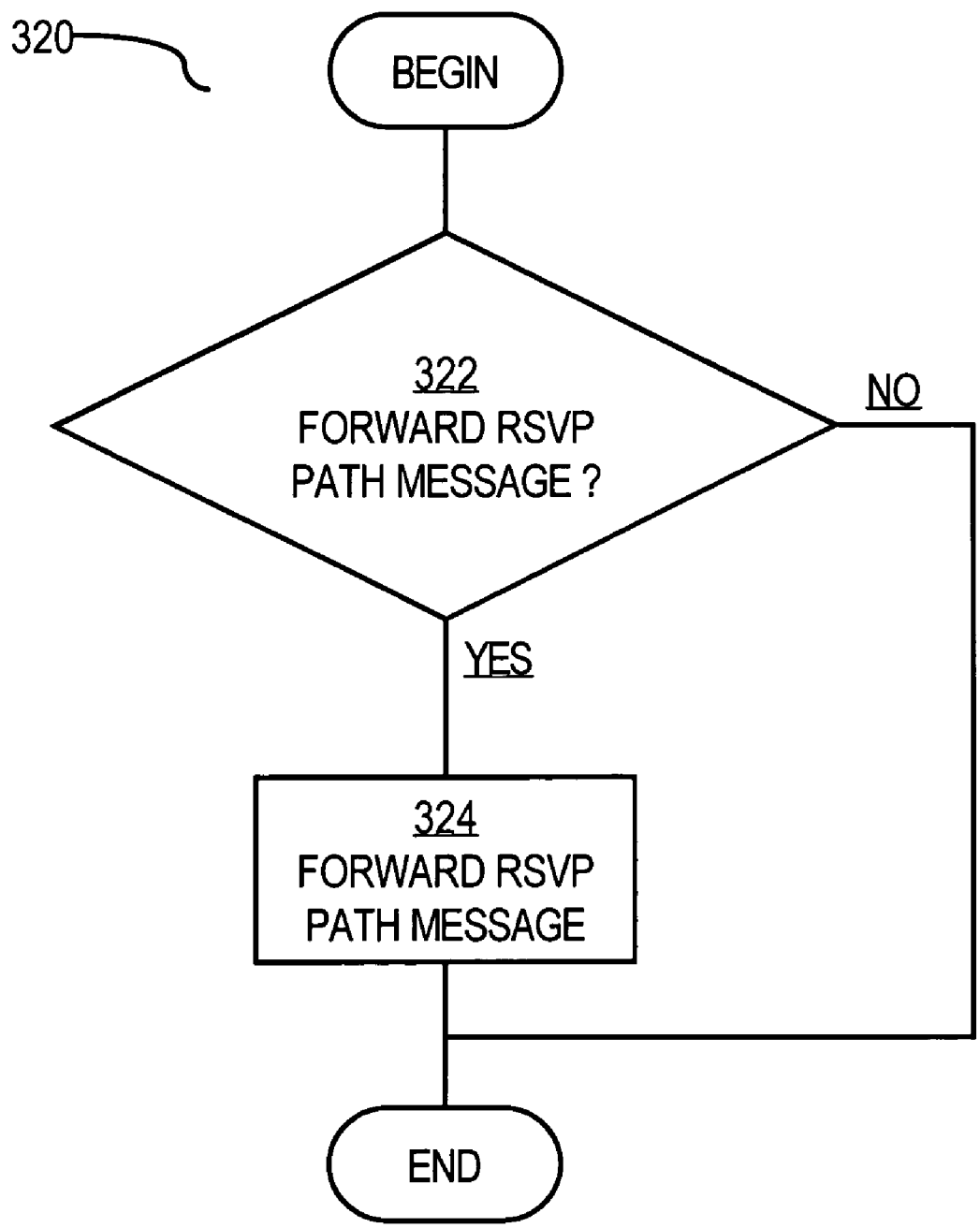
FIG. 4 is a flow diagram of a method that can be included as part of the method of FIG. 3, in accordance with an embodiment of the present invention.

FIG. 4 is a block diagram of a method that can be included in the method 300 of FIG. 3, for example, between operations 304 and operation 308.

Method 320 of FIG. 4 includes determining, in operation 322, whether to forward the RSVP Path message to one or more intended receivers, even though operation 304 has determined to generate and communicate a RESV message. Operation 322 may be used, for example, when an RESV proxy in the position of receiver wishes to issue a counter-message that defines a different set of traffic characteristics for the flow initiated by the sender. Operation 322 also may be used when the RESV proxy wishes to explicitly announce its presence in the network to an RSVP-enabled device that is in the position of sender.

If operation 322 determines not to forward the RSVP Path message, then method 320 returns control or ends. For example, in the case where method 320 is placed between operations 304 and 308 of method 300 in FIG. 3, method 300 will continue with operation 308.

If operation 322 determines to forward the RSVP Path message, then the RSVP Path message is forwarded in operation 324. As with operation 304 and operation 306 of method 300 described above, the determination of operation 322 can be made for each of one or more of the anticipated receivers. Thus, even if a RESV message is generated and communicated in operation 308 and operation 310 for an anticipated receiver, the RSVP Path message may still be forwarded to that receiver.

Figure 5:
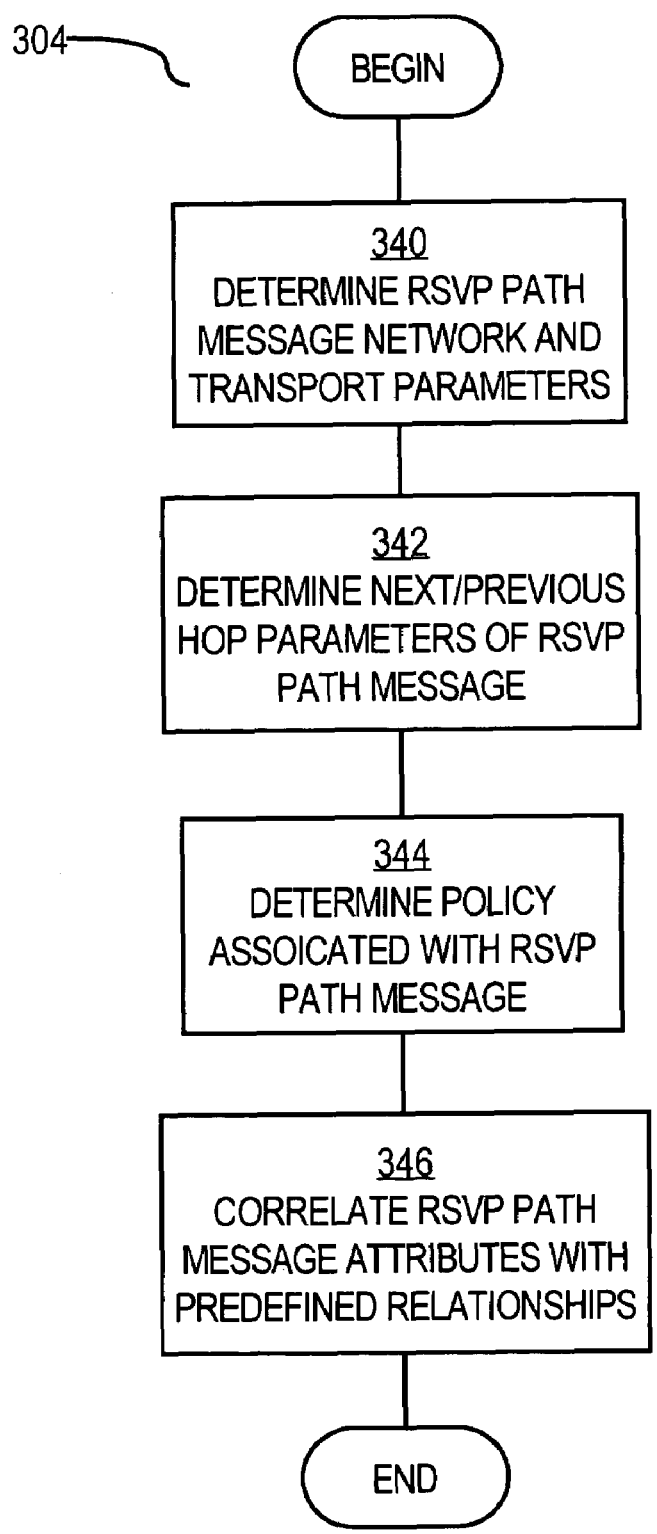
FIG. 5 is a flow diagram of operations that can be included within a portion of method in FIG. 3.

FIG. 5 is a block diagram of operations that can be included in operation in 304 of method 300.

In operation 340, the anticipated traffic flow network and transport parameter values are determined from the RSVP Path message. As described above, the network and transport parameters can include, for example, the source and destination IP addresses and port numbers, and protocols. The network and transport parameters can further include the bandwidth, packet size, packet rate, and average rate.

In operation 342, the next and previous hop parameter values associated with the anticipated traffic flow are determined from the RSVP Path message. As defined in the RSVP protocol, a Path message may include an RSVP _HOP object that carries the IP address of the RSVP-capable node that sent the message and a logical outgoing interface handle. As stated in RFC 2205, an RSVP_HOP object may be a PHOP (previous hop) object for downstream messages or an NHOP (next hop) object for upstream objects.

Also, one or more policies associated with the RSVP Path message can be determined in operation 344. The RSVP protocol defines a POLICY_DATA object that may carry policy information. Thus, policy information can be obtained by extracting any POLICY_DATA object that forms part of the RSVP Path message. Such policies can define traffic flow treatment, as discussed above.

The various RSVP Path message attributes, e.g., traffic flow parameter values, are correlated in operation 346 with predefined relationships and/or logic relating such attributes with whether or not generation and communication of a RESV message is appropriate. For example, such relationships and/or logic can be in the form of policies such as "If FLOWSPEC=3, then generate a RESV message" or "If FLOWSPEC=1, then do not generate a RESV message." As defined in RFC 2205, FLOWSPEC=3 indicates a request for guaranteed quality of service, whereas FLOWSPEC=1 is a flow specification requiring controlled delay. The predefined relationships or logic can be defined prior to the detection of the RSVP Path message of method 300, for example, during configuration of the RESV proxy. The correlation of operation 346 can be performed in conjunction with a policy server or other external policy decision point. Based on the information provided by the RESV proxy and policies resident on the policy server, the policy server can return the relationships or logic to the RESV proxy, or can make and return the determination of whether an RSVP Path message is needed.

If an embodiment of method 300 is performed by an RESV proxy, then the RESV message thereafter is communicated only through the sub-path between the proxy and the sender, or between a sniffing location along the sender-anticipated receiver path and the sender. In such a case, the ensuing path reservations will be made only in the network devices of that sub-path, and not in the network devices between the RESV proxy and the anticipated receiver. Therefore, it is desirable to locate the RESV proxy as close as possible to the anticipated receiver device. In alternative embodiments, with appropriate modification, the RESV proxy can generate a pseudo-RESV message and communicate the pseudo-RESV message along the remainder of the anticipated path between the RESV proxy and the anticipated receiver, thereby making a path reservation along more of the anticipated path.

The present invention provides a simple, efficient, low-cost mechanism for taking advantage of the benefits of RSVP in passing traffic flows through a network, even when the anticipated receivers of such traffic flows are not designed, or are otherwise unable, to facilitate a reservation process by responding to a RSVP Path message by generating and communicating a RESV message. Thus, RSVP resource scheduling can be used with traffic flows intended for receivers that are non-RSVP-enabled, not trusted, or spared the burden of such tasks, by design or usage. Furthermore, some devices can be less expensive when non-RSVP-enabled. The present invention, therefore, allows the use of such less expensive devices while still providing desired QoS. In addition, when a RESV proxy device is included in the paths of traffic flows from more than one sender device, the complexity and cost savings over what would be required to provide the same capabilities directly to the various end devices themselves, are thereby magnified.

Hardware Overview

Figure 6:
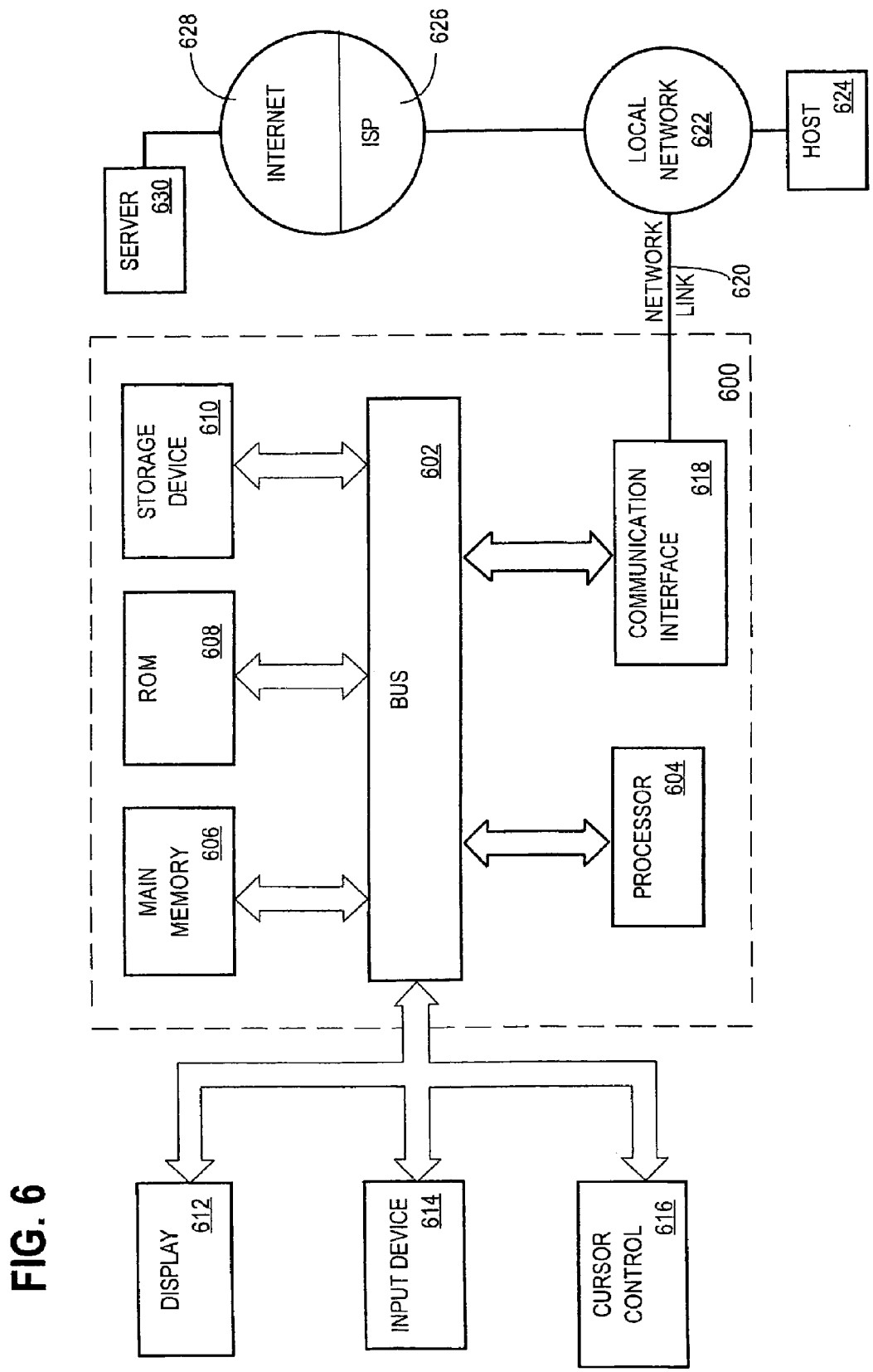
FIG. 6 is a block diagram of a computer system with which an embodiment of the present invention may be carried out.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for providing RSVP process facilitation for anticipated traffic flow receivers that do not otherwise do so alone. According to one embodiment of the invention, providing RSVP process facilitation for anticipated receivers that do not otherwise do so alone is facilitated by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for policy-based management of quality of service treatments of network data traffic flows by integrating policies with application programs as described herein.

The received code may be executed by processor 604 as it is received, and/or stored in storage device 610, or other non-volatile storage for later execution. In this manner, computer system 600 may obtain application code in the form of a carrier wave.

SCOPE

A method and apparatus providing RSVP resource reservation for anticipated traffic flows that are anticipated to be received by devices that do not facilitate the RSVP process have been described. The invention has been described herein in terms of several specific embodiments. Other embodiments of the invention, including alternatives, modifications, permutations and equivalents of the embodiments described herein, will be apparent to those skilled in the art from consideration of the specification, study of the drawings, and practice of the invention. For example, while only one RESV proxy has been shown, more than one RESV proxy can be included in a network. Also, the functionality of the RESV proxy can be included in the sender device, rather than a separate physical entity on the network. The specification and drawings are, accordingly, to be regarded in an illustrative rather than a restrictive sense. The embodiments and specific features described above in the specification and shown in the drawings should be considered exemplary rather than restrictive, with the invention being defined by the appended claims, which therefore include all such alternatives, modifications, permutations and equivalents as fall within the true spirit and scope of the present invention.

What is claimed is:

1. A method of establishing a network resources reservation for an anticipated traffic flow along a path in a network between an anticipated source and an anticipated receiver of the traffic flow, wherein the anticipated receiver otherwise cannot facilitate establishing the network resources reservation, the method comprising the steps of:

storing, at a proxy node, policy information defining whether the proxy node should initiate network resources reservations for particular traffic flows;

detecting a first RSVP Path message associated with the anticipated receiver of the anticipated traffic flow at a router, acting as a proxy node, located within the path;

determining, at the proxy node and based on the policy information stored at the proxy node and without receiving the policy information from a policy server residing on the network, whether to establish the network resources reservation;

generating, at the proxy node, an RESV message to reserve network resources for the anticipated traffic flow;

communicating the RESV message to the anticipated source of the anticipated traffic flow;

wherein the step of determining, at the proxy node, whether to establish the network resources reservation includes the steps of:

determining one or more network parameter values associated with the anticipated traffic flow;

determining one or more transport parameter values associated with the anticipated traffic flow;

determining next and previous hop parameter values associated with the anticipated traffic flow;

correlating at least one of the ascertained network parameter, transport parameter, next hop parameter, and previous hop parameter values with information defining a relationship between them and whether a RESV message is desired; and concurrently with the generating and communicating steps, forwarding a second RSVP Path message to one or more devices that are along the anticipated path and that are between the proxy node and the anticipated receiver, wherein the second RSVP Path message defines a different set of traffic characteristics for the flow initiated by the sender than the first RSVP message.

2. A method as recited in claim 1, further comprising the step of determining one or more device and traffic parameter values associated with the anticipated traffic flow, and wherein the step of generating the RESV message comprises the step of generating the RESV message based on at least one of the device and traffic parameter values.

3. A method as recited in claim 1, wherein determining the network parameter values and ascertaining the transport parameter values includes the steps of determining at least one of the source and receiver IP addresses, source and receiver port numbers, and transport protocol based on values carried in objects in the first RSVP Path message.

4. A method as recited in claim 1, wherein determining the anticipated traffic flow characteristics includes determining at least one of the rate and size of packets associated with the anticipated traffic flow.

5. A method as recited in claim 1, further comprising the steps of extracting one or more additional anticipated traffic flow attributes from the first RSVP Path message.

6. A method as recited in claim 5, wherein the anticipated receiver is an IP phone, and further comprising the step of determining at least one quality of service parameter associated with the anticipated traffic flow.

7. A method as recited in claim 1, wherein the step of detecting an RSVP Path message comprises the step of detecting the first RSVP Path message associated with the anticipated receiver of the anticipated traffic flow at a proxy node that is logically positioned adjacent to the path.

8. A computer readable medium comprising one or more sequences of instructions for facilitating an RSVP reservation process, for an anticipated traffic flow anticipated to be received by an anticipated receiver that cannot facilitate an RSVP reservation process for the anticipated traffic flow, wherein the computer readable medium comprises either a volatile medium or a non-volatile medium, and wherein when the instructions are executed by one or more processors, the instructions cause the one or more processors to carry out the steps of:

storing, at a proxy node, policy information defining whether the proxy node should initiate network resources reservations for particular traffic flows;

detecting a first RSVP Path message associated with the anticipated receiver of the anticipated traffic flow at a router, acting as a proxy node, located within the path;

determining, at the proxy node and based on the policy information stored at the proxy node and without receiving the policy information from a policy server residing on the network, whether to establish the network resources reservation;

generating, at the proxy node, an RESV message to reserve network resources for the anticipated traffic flow;

communicating the RESV message to the anticipated source of the anticipated traffic flow;

wherein the step of determining, at the proxy node, whether to establish the network resources reservation includes the steps of:

determining one or more network parameter values associated with the anticipated traffic flow;

determining one or more transport parameter values associated with the anticipated traffic flow;

determining next and previous hop parameter values associated with the anticipated traffic flow; and correlating at least one of the ascertained network parameter, transport parameter, next hop parameter, and previous hop parameter values with information defining a relationship between them and whether a RESV message is desired; and concurrently with the generating and communicating steps, forwarding a second RSVP Path message to one or more devices that are along the anticipated path and that are between the proxy node and the anticipated receiver, wherein the second RSVP Path message defines a different set of traffic characteristics for the flow initiated by the sender than the first RSVP message.

9. A computer-readable medium as recited in claim 8, further comprising the step of determining one or more device and traffic parameter values associated with the anticipated traffic flow, and wherein the step of generating the RESV message comprises the step of generating the RESV message based on at least one of the device and traffic parameter values.

10. A computer-readable medium as recited in claim 8, wherein determining the network parameter values and ascertaining the transport parameter values includes the steps of determining at least one of the source and receiver IP addresses, source and receiver port numbers, and transport protocol based on values carried in objects in the first RSVP Path message.

11. A computer-readable medium as recited in claim 8, wherein determining the anticipated traffic flow characteristics includes determining at least one of the rate and size of packets associated with the anticipated traffic flow.

12. A computer-readable medium as recited in claim 8, further comprising the steps of extracting one or more additional anticipated traffic flow attributes from the first RSVP Path message.

13. A computer-readable medium as recited in claim 12, wherein the anticipated receiver is an IP phone, and further comprising the step of determining at least one quality of service parameter associated with the anticipated traffic flow.

14. A computer-readable medium as recited in claim 8, wherein the step of detecting an RSVP Path message comprises the step of detecting the first RSVP Path message associated with the anticipated receiver of the anticipated traffic flow at a proxy node that is logically positioned adjacent to the path.

15. A system for establishing a network resources reservation for an anticipated traffic flow along a path in a network between an anticipated source and an anticipated receiver of the traffic flow, wherein the anticipated receiver otherwise cannot facilitate establishing the network resources reservation, the system comprising:

means for storing, at a proxy node, policy information defining whether the proxy node should initiate network resources reservations for particular traffic flows;

means for detecting a first RSVP Path message associated with the anticipated receiver of the anticipated traffic flow at a router, acting as a proxy node, located within the path;

means for determining, at the proxy node and based on the policy information stored at the proxy node and without receiving the policy information from a policy server residing on the network, whether to establish the network resources reservation;

means for generating, at the proxy node, an RESV message to reserve network resources for the anticipated traffic flow;

means for communicating the RESV message to the anticipated source of the anticipated traffic flow; and wherein the means for determining, at the proxy node, whether to establish the network resources reservation includes:

means for determining one or more network parameter values associated with the anticipated traffic flow;

means for determining one or more transport parameter values associated with the anticipated traffic flow;

means for determining next and previous hop parameter values associated with the anticipated traffic flow;

means for correlating at least one of the ascertained network parameter, transport parameter, next hop parameter, and previous hop parameter values with information defining a relationship between them and whether a RESV message is desired and means for forwarding, concurrently with operation of the means for generating and the means for communicating, a second RSVP Path message to one or more devices that are along the anticipated path and that are between the proxy node and the anticipated receiver, wherein the second RSVP Path message defines a different set of traffic characteristics for the flow initiated by the sender than the first RSVP message.

16. A system as recited in claim 15, further comprising means for determining one or more device and traffic parameter values associated with the anticipated traffic flow, and wherein the means for generating the RESV message comprises means for generating the RESV message based on at least one of the device and traffic parameter values.

17. A system as recited in claim 15, wherein the means for determining the network parameter values and ascertaining the transport parameter values includes means for determining at least one of the source and receiver IP addresses, source and receiver port numbers, and transport protocol based on values carried in objects in the first RSVP Path message.

18. A system as recited in claim 15, further comprising means for determining the anticipated traffic flow characteristics determining at least one of the rate and size of packets associated with the anticipated traffic flow.

19. A system as recited in claim 15, further comprising means for extracting one or more additional anticipated traffic flow attributes from the first RSVP Path message.

20. A system as recited in claim 18, wherein the anticipated receiver is an IP phone, and further comprising means for determining at least one quality of service parameter associated with the anticipated traffic flow.

21. A system as recited in claim 15, wherein the means for detecting an RSVP Path message comprises means for detecting a first RSVP Path message associated with the anticipated receiver of the anticipated traffic flow at a proxy node that is logically positioned adjacent to the path.

22. A network device that can establish a network resources reservation for an anticipated traffic flow along a path in a network between an anticipated source and an anticipated receiver of the traffic flow, wherein the anticipated receiver otherwise cannot facilitate establishing the network resources reservation, the network device comprising:
 a network interface;
 a processor coupled to the network interface and receiving network messages from the network through the network interface;
 a computer-readable medium comprising one or more stored sequences which, when executed by the processor, cause the processor to carry out the steps of:
  storing, at a proxy node, policy information defining whether the proxy node should initiate network resources reservations for particular traffic flows;
  detecting a first RSVP Path message associated with the anticipated receiver of the anticipated traffic flow at a router, acting as a proxy node, located within the path;
  determining, at the proxy node and based on the policy information stored at the proxy node and without receiving the policy information from a policy server residing on the network, whether to establish the network resources reservation;
  generating, at the proxy node, an RESV message to reserve network resources for the anticipated traffic flow;
  communicating the RESV message to the anticipated source of the anticipated traffic flow;
  wherein the step of determining, at the proxy node, whether to establish the network resources reservation comprises the steps of:
   determining one or more network parameter values associated with the anticipated traffic flow;
   determining one or more transport parameter values associated with the anticipated traffic flow;
   determining next and previous hop parameter values associated with the anticipated traffic flow; and
   correlating at least one of the ascertained network parameter, transport parameter, next hop parameter, and previous hop parameter values with information defining a relationship between them and whether a RESV message is desired; and
  concurrently with the generating and communicating steps, forwarding a second RSVP Path message to one or more devices that are along the anticipated path and that are between the proxy node and the anticipated receiver, wherein the second RSVP Path message defines a different set of traffic characteristics for the flow initiated by the sender than the first RSVP message.

23. A network device as recited in claim 22, wherein the one or more stored sequences, when executed by the processor, cause the processor to further carry out the step of determining one or more device and traffic parameter values associated with the anticipated traffic flow, and wherein the step of generating the RESV message comprises the step of generating the RESV message based on at least one of the device and traffic parameter values.

24. A network device as recited in claim 22, wherein determining the network parameter values and ascertaining the transport parameter values includes the steps of determining at least one of the source and receiver IP addresses, source and receiver port numbers, and transport protocol based on values carried in objects in the first RSVP Path message.

25. A network device as recited in claim 22, wherein determining the anticipated traffic flow characteristics includes determining at least one of the rate and size of packets associated with the anticipated traffic flow.

26. A network device as recited in claim 22, wherein the one or more stored sequences, when executed by the processor, cause the processor to further carry out the step of extracting one or more additional anticipated traffic flow attributes from the RSVP Path message.

27. A network device as recited in claim 26, wherein the anticipated receiver is an IP phone, and wherein the one or more stored sequences, when executed by the processor, cause the processor to further carry out the step of determining at least one quality of service parameter associated with the anticipated traffic flow.

28. A network device as recited in claim 22, wherein the step of detecting an RSVP Path message comprises the step of detecting the first RSVP Path message associated with the anticipated receiver of the anticipated traffic flow at a proxy node that is logically positioned adjacent to the path.

* * * * *

UNITED STATES PATENT AND TRADEMARK OFFICE
CERTIFICATE OF CORRECTION

| | | |
|---|---|---|
| PATENT NO. | : 7,423,971 B1 | Page 1 of 1 |
| APPLICATION NO. | : 09/586531 | |
| DATED | : September 9, 2008 | |
| INVENTOR(S) | : Shai Mohaban and Itzhak Parnafes | |

It is certified that error appears in the above-identified patent and that said Letters Patent is hereby corrected as shown below:

On the title page item (75), should read

Inventors:    Shai Mohaban, Sunnyvale, CA (US);
                      Itzhak Parnafes, Cupertino, CA (US);
                      Silvano Gai, San Jose, CA (US);
                      Dinesh G. Dutt, San Jose, CA (US)

Signed and Sealed this

First Day of November, 2011

David J. Kappos
*Director of the United States Patent and Trademark Office*